(12) United States Patent
Lightfoot, Jr.

(10) Patent No.: US 7,141,171 B2
(45) Date of Patent: Nov. 28, 2006

(54) MEMBRANE CASCADE-BASED SEPARATION

(75) Inventor: Edwin N. Lightfoot, Jr., Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 11/134,553

(22) Filed: May 20, 2005

(65) Prior Publication Data

US 2005/0258100 A1    Nov. 24, 2005

Related U.S. Application Data

(60) Provisional application No. 60/660,698, filed on Mar. 11, 2005, provisional application No. 60/573,506, filed on May 21, 2004.

(51) Int. Cl.
| | |
|---|---|
| *B01D 61/00* | (2006.01) |
| *B01D 63/00* | (2006.01) |
| *A61M 1/16* | (2006.01) |
| *B01D 11/00* | (2006.01) |

(52) U.S. Cl. .................. 210/641; 210/650; 210/195.2; 210/257.2; 210/321.75

(58) Field of Classification Search ........ 210/650–654, 210/641, 644, 195.2, 257.2, 321.6, 321.8, 210/321.89, 634, 321.75; 426/271
See application file for complete search history.

(56) References Cited

U.S. PATENT DOCUMENTS

| | | | | |
|---|---|---|---|---|
| 4,863,609 A | * | 9/1989 | Schnabel et al. | ............ 210/641 |
| 5,164,092 A | * | 11/1992 | Munch | ........................ 210/641 |
| 5,284,589 A | * | 2/1994 | Tegtmeyer et al. | ......... 210/641 |
| 5,338,553 A | * | 8/1994 | Johnson et al. | ............... 426/36 |
| 5,354,945 A | * | 10/1994 | Detering et al. | ............ 523/310 |
| 5,576,040 A | * | 11/1996 | Moller et al. | ................ 426/271 |
| 5,597,486 A | * | 1/1997 | Lutz | ........................... 210/639 |
| 5,685,990 A | | 11/1997 | Saugmann | ................... 210/650 |
| 5,928,517 A | * | 7/1999 | Smith et al. | ................. 210/650 |
| 6,486,306 B1 | * | 11/2002 | Winge | ........................ 530/414 |
| 6,521,127 B1 | * | 2/2003 | Chancellor | ............. 210/321.72 |
| 6,635,296 B1 | | 10/2003 | Nissen | ........................ 426/422 |

FOREIGN PATENT DOCUMENTS

| | | |
|---|---|---|
| DE | 100 04 155 A1 | 8/2001 |
| EP | 0 014 166 | 8/1980 |
| WO | WO 93/23150 | 11/1993 |

OTHER PUBLICATIONS

Cheang, B., et al., "A two-stage ultrafiltration process for fractionation of whey protein isolate" *Journal of Membrane Science*, Elesevier Scientific Publ. Co. Amsterdam, NL, 231(1-2): 159-167(Mar. 1994).

(Continued)

*Primary Examiner*—Ana M. Fortuna
(74) *Attorney, Agent, or Firm*—Godfrey & Kahn, S.C.

(57) ABSTRACT

The present invention provides counter flow cascade separation systems useful to separate solute/solute pairs present in a solvent. The separation systems include a series of interconnected stages with each stage comprising a combination of a diafilter preferentially permeable for one solute and an ultrafilter that accepts a permeate flow from the diafilter. The ultrafilter is permeable to solvent. Solute/solute pairs are preferentially separated by the diafilter into permeate and retentate flows and excess solvent is removed from the permeate flow by the ultrafilter and recycled back into the system. Stages are combined to form a counter flow cascade separation system capable of operation approaching an ideal counter flow cascade.

6 Claims, 9 Drawing Sheets

OTHER PUBLICATIONS

McCandless, F.P., "Stage extent of separation in ideal countercurrent recycle membrane cascades," *Journal of Membrane Science*, Elesevier Scientific Publ. Co. Amsterdam, NL, 154(1): 15-23 (Mar. 3, 1999).

Avgidou, M. S., et al., "Membrane Cascade Schemes for Separation of LPG Olefins and Paraffins." J. Mem. Sci., 233: p. 21-37 (2003).

Barker, P., and Till, A., "Using Multistage Techniques to Improve Diafiltration Fractionation Efficiency." J. Mem. Sci., 72: p. 1-11 (1992).

Brans, G., et al., "Membrane Fractionation of Milk: State of the Art and Challenges." J. Mem. Sci., 243(1-2): p. 263-272 (2004).

Cheang, B., and Zydney, A. L., "Separation of Alpha-Lactalbumin and Beta-Lactoglobulin Using Membrane Ultrafiltration." Biotechnol. Bioeng., 83(2): p. 201-209 (2003).

Ebersold, M. F., and Zydney, A. L., "Separation of Protein Charge Variants by Ultrafiltration. Biotech. Prog.," 20: p. 543-549 (2004).

Ghosh, R., "Novel Cascade Ultrafiltration Configuration for Continuous, High-Resolution Protein-Protein Fractionation: a Simulation Study." J. Mem. Sci. 226: p. 85-99 (2003).

Iritani, E., et al., "Fractionation Characteristics of Binary Protein Mixtures by Ultrafiltration." Sep. Sci. Tech., 30: p. 369-382 (1995).

Kim, C., and Friedly, J. C., "Approximate Dynamic Modeling of Large Staged Systems." Ind. Eng. Chem., Process Des. Develop., 13(2): p. 177-181 (1974).

Krstić, D., et al., "Saving Water in a Volume-decreasing Diafiltration Process." Desalination 165: p. 283-288 (2004).

Lightfoot, E. N., "Can Membrane Cascades Replace Chromatography? Adapting Binary Ideal Cascade Theory of Systems of Two Solutes in a Single Solvent" Sep. Sci. Tech., 40: p. 740-756 (2005).

Lipnizki, F., Boelsmand, J., Madsen, R.F., "Concepts of Industrial-Scale Diafiltration Systems." Desalinization, 144: p. 179-184 Sp. Iss. (2002).

Madsen, R., Sep. and Purif. Tech., 22-23: p. 79-87.

Mehra, R., and Kelly, P. M., "Whey Protein Fractionation Using Cascade Membrane Filtration." Bulletin of the International Dairy Federation, 389: p. 40-44 (2004).

Morison, K. R., and She, X., "Optimisation and Graphical Representation of Multi-Stage Membrane Plants." J. Mem. Sci., 211(1): p. 59-70 (2003).

Muller, A., et al., "Ultrafiltration Modes of Operation for the Separation of Alpha-Lactalbumin from Acid Casein Whey." J. Mem. Sci., 153(1): p. 9-21 (1999).

Ng. P., et al., "Optimization of Solute Separation by Differential Filtration," Sep. Sci, 11: p. 499-502 (1976).

Robertson, B. C., and Zydney, A. L., "Polarization and Adsorption Effects on Sieving in Membrane Protein Filtration." Dep. Chem. Eng., Univ. Delaware, Newark, DE, USA. ASAIO Transactions, 33(3): 118-22 (1987).

Romero, J., and A. L. Zydney, "Chiral Separations Using Ultrafiltration with a Stereospecific Binding Agent." Sep. Sci. Tech., 36: p. 1575-1594 (2001).

Saksena, S., and Zydney, A. L., "Effect of Solution pH and Ionic Strength on Separation of Albumin from Immunoglobulins by Selective Filtration." Biotech. Bioeng, 43: p. 960-968 (1994).

Sieberth, H. G., et al., "Cascade Filtration for Separating Plasma Proteins of Different Molecular Weights." Proceedings of the European Dialysis and Transplant Association, 17: 347-52 (1980).

van Eijndhoven, H.C.M., et al., "Protein Fractionation Using Electrostatic Interactions in Membrane Filtration." Biotech. Bioeng., 48: p. 406-414 (1995).

van Reis, R., et al., "Constant $C_{wall}$ Ultrafiltration Process Control." J. Mem. Sci., 130(1-2): p. 123-140 (1997).

van Reis, R., et al., "High Performance Tangential Flow Filtration." Biotech. Bioeng., 56: p. 71 (1997).

Yang, M. -C., and Tong, J. -H., "Loose Ultrafiltration of Proteins Using Hydrolyzed Hollow Fiber." J. Mem. Sci., 132: p. 63-71 (1997).

\* cited by examiner

Molar Fluxes: $N_i \, ^o \, c_i S_i v$

$$N_A / N_B = Y_A$$

$$= (c_A / c_B)(S_A / S_B)$$

$$= X_A \Phi_A$$

$$\Phi = S_A / S_B$$

FIG. 7

Separation factor:

$$Y_n / X_n = \alpha$$

|  | 100 Kda | | 30 Kda | | MW Kda | Conc g/L | Conc mM |
|---|---|---|---|---|---|---|---|
| I | S | Φ | S | Φ | | | |
| αLA | 0.67 | - | 0.23 | - | 14 | 1.5 | 0.107 |
| βLA | 0.16 | 4.2 | 0.011 | 21 | 18 | 18 | 0.441 |
| BSA | 0.009 | 74 | 0 | ∞ | 67 | | |

MEMBRANE CASCADE-BASED SEPARATION

CROSS-REFERENCE TO RELATED APPLICATIONS

The present application claims the benefit of U.S. Provisional application 60/573,506, filed May 21, 2004 and U.S. Provisional application 60/660,698, filed Mar. 11, 2005, both of which are incorporated by reference herein in their entirety for all purposes.

FIELD OF THE INVENTION

This invention relates generally to membrane cascades for separating constituents of a fluid solution. The invention is more specifically directed to membrane-based modules and the use of same in countercurrent cascade systems to separate solute/solute pairs from a solvent.

BACKGROUND OF THE INVENTION

Process chromatography in its many variant forms has become the dominant downstream processing tool for difficult separations in biotechnology, but it is inherently expensive and is not used to a significant extent for commercial scale separations in any other industry. In particular, process chromatography is not used significantly in food processing or petrochemical technology. Chromatography depends upon concentration diffusion between stationary and mobile phases, and, as commercial interest shifts toward larger substrates such as plasmids and viruses, diffusion tends to become slower and to make separations increasingly difficult.

At the same time, many other potentially competitive techniques have been developing, and engineers have finally begun to show real initiative for process development in a variety of biological applications. Lightfoot, E. N., and J. S. Moscariello, 2004, Bioseparations, *Biotech. and Bioeng.* 87: 259–273. Increasingly efficient renaturation of proteins from inclusion bodies shows promise of replacing the capture steps now performed by batch adsorption chromatography in a variety of applications, and crystallization appears to be increasing in importance for finer separations. Simulated moving beds are receiving increased attention.

Membrane filtrations are already providing increased competition to chromatography for the polishing stages of downstream processing, and they are becoming more and more selective, even for such large molecules as proteins. Cheang, B., and A. L. Zydney, 2004, A two-stage ultrafiltration process for fractionation of whey protein isolate, *J. Mem. Sci.* 231: 159–167. Several investigators report the use of simple two-stage cascades, but these cascades do not incorporate counterflow principles.

There is also increasing interest in continuous downstream processing for which chromatography is ill suited. Use of simulated moving beds, the only continuous process currently available, is both cumbersome and poorly suited to feedback control. To date, these devices have been limited to very clean stable systems, for example in the resolution of enantiomers from highly purified racemic mixtures. Finally, there is increasing interest in larger entities such as nucleic acids and viruses, and these have such low diffusivities that the choice of suitable adsorbents is severely limited. Pressure induced flow across selective membranes however can increase transport rates by convection relative to those for diffusion alone. Bird, R. B., W. E. Stewart, and E. N. Lightfoot. 2002, "Transport Phenomena", Wiley.

A new look at downstream processing is warranted, and membrane cascades may provide new and important methods for separating components from mixtures. Membrane selectivities are rapidly increasing, and there is now a wealth of practical operating experience available for purposes of preliminary design. Moreover, membranes are available for dealing with an extremely wide range of molecular weights, from small monomeric molecules to mammalian cells. Moreover, the technology of dealing with membrane cascades was very highly developed during the 1940s in connection with the effusion process for uranium isotope fractionation. Von Halle, E, and J. Schachter, 1998, "Diffusion Separation Methods", in Kirk-Othmer Encyclopedia of Chemical Technology, 4th Ed., J. Kroschwitz, Ed., Wiley. Even very simple cascades have not been widely used in biotechnology, however, in large part because of control problems and lack of operating experience. Membrane cascades thus present a promising field for research and development. A logical starting point for investigation will be the ideal cascade theory of isotope separations. As described below, isotope separations have much in common with potential biological applications.

It is desirable to start with simple prototype systems and then move by degrees to more complex systems in more promising situations. Fortunately, there are some simple applications where useful results can be obtained rather simply. One can then gain experience and at the same time produce economic processes. There are guides in the literature to aid in this stepwise approach. There are several examples of essentially binary protein solutions (e.g., Cheang and Zydney, *J. Mem. Sci* 231 (2004)). Another logical starting point would be the tryptophan resolution of Romero and Zydney as the components are inexpensive and stable, and assays are unusually simple. Moreover, one needs only an ultrafiltration membrane under situations where sensitivity to minor changes in behavior is probably insignificant-one can concentrate here on solvent problems and development of a reliable control strategy. One can then proceed to other well-documented and simple separations such as removal of dimers from monomeric bovine serum albumin (BSA). After that, one can begin in earnest on systems where a more complex cascade is particularly desired.

Many cascade separation systems have been proposed, but none apparently incorporating the ideal cascade approach where design strategy is divided into: (i) separation of the solutes of interest using a solvent-free description; and (ii) solvent management.

SUMMARY OF THE INVENTION

The present invention is directed to counter flow cascade separation systems for separating a solute/solute pair in a solvent. A counter flow cascade separation system according to the invention comprises a series of interconnected stages in which each stage includes a diafilter that accepts a flow stream containing a solute/solute pair in a solvent. The diafilter is preferentially permeable for a first solute of the solute/solute pair and the diafilter preferentially passes the first solute to a permeate flow while preferentially retaining the remaining solute in a retentate flow. The stage further includes an ultrafilter that accepts from the diafilter the permeate flow wherein the ultrafilter is selectively permeable to the solvent but not the remaining solute contained in the permeate flow. Stages of the system are interconnected so that each stage beyond an first stage accepts an intermixed flow stream formed by combining retentate flow and permeate flow from different stages wherein intermixed retentate flow and permeate flow each have the solute/solute pair present in substantially the same molar ratio. The solute/solute pair is thusly separated by counter flow cascade through the interconnected series of stages.

In preferred embodiments, the system consists of three interconnected stages. Preferred systems according to the invention recycle solvent collected by ultrafilters and route that solvent back to a flow stream. In certain embodiments, a system according to the invention includes at least one stage that further comprises a macroporous membrane capable of distributing solvent evenly over the diafilter.

In another embodiment, the invention provides a method for separating a solute/solute pair in a solvent. Such a method includes steps of routing a flow stream containing a solute/solute pair in a solvent to a diafilter that is preferentially permeable for a first solute of the solute/solute pair. The diafilter preferentially passes the first solute to a permeate flow while preferentially retaining the remaining solute in a retentate flow. The permeate flow is then routed to an ultrafilter that is selectively permeable to the solvent but not the remaining solute contained in the permeate flow in order that excess solvent contained in solvent is removed from the permeate flow.

The permeate flow and retentate flow are routed to successive interconnected stages wherein the stages beyond a first stage accept an intermixed flow stream formed by combining retentate flow and permeate flow from different stages. The intermixed retentate flow and permeate flow each have the solute/solute pair present in substantially the same molar ratio and operation of the system approaches an ideal cascade.

The invention is further directed to a stage in a counter flow cascade separation system for use in separating a solute/solute pair in a solvent. Such a stage includes a diafilter that accepts a flow stream containing a solute/solute pair in a solvent. The diafilter is preferentially permeable for a first solute of the solute/solute pair wherein the diafilter preferentially passes the first solute to a permeate flow while preferentially retaining the remaining solute in a retentate flow. The stage further includes an ultrafilter that accepts from the diafilter the permeate flow wherein the ultrafilter is selectively permeable to the solvent but not the remaining solute contained in the permeate flow. The stage is capable of separating the solute/solute pair into the permeate flow and retentate flow and the ultrafilter removes excess solvent from the permeate flow.

Other objects, features and advantages of the present invention will become apparent after review of the specification, claims and drawings.

DETAILED DESCRIPTION OF THE INVENTION

In the invention dislosed herein, membranes are combined to carry out dialfiltration (DF) and ultrafiltration (UF) operations in such manner to approach and/or achieve an ideal cascade. The reasons for using membranes are their rapidly increasing selectivity and productivity, as well as their insensitivity to diffusion. Various membranes known in the art may be utilized to carry out the present invention but will meet the following general design parameters. Diafilters useful in the present invention are selectively permeable to one solute of a selected solute/solute pair. Ultrafilters useful in the present invention are permeable to solvent but not to either solute of the selected solute/solute pair. The cascade method presented here is based on ideal counterflow. The major considerations are resolution and solvent conservation. The fundamental operation of diafiltration and ultrafiltration does not appear to have previously been recognized. A major advantage of the DF-UF combination is that it facilitates the separate design of the solute-solute separation and solvent management. It thus reduces the number of possibilities that must be considered.

Figure 1A:
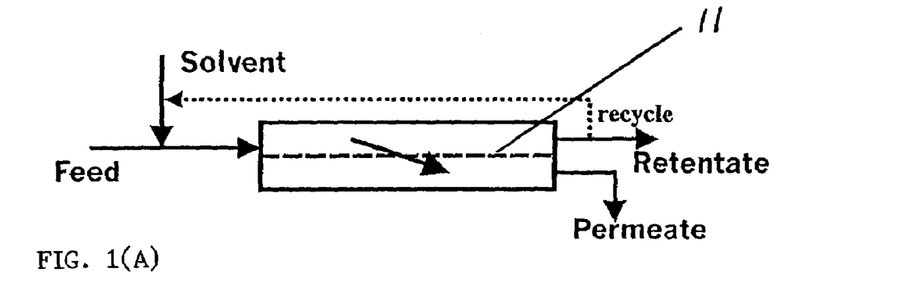
FIG. 1(A) depicts a conventional membrane separation of a feed stream into retentate and permeate streams using a single membrane 11 with the optional routing of solvent back to a feed stream. In contrast.
Figure 1B:
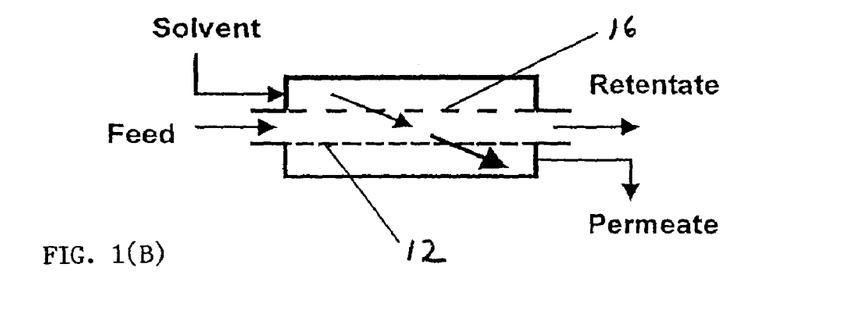
FIG. 1(B) illustrates a membrane-based separation according to the present invention utilizing an additional macroporous membrane to distribute solvent over a volume of a retentate-containing compartment and underlying diafilter.
Figure 2:
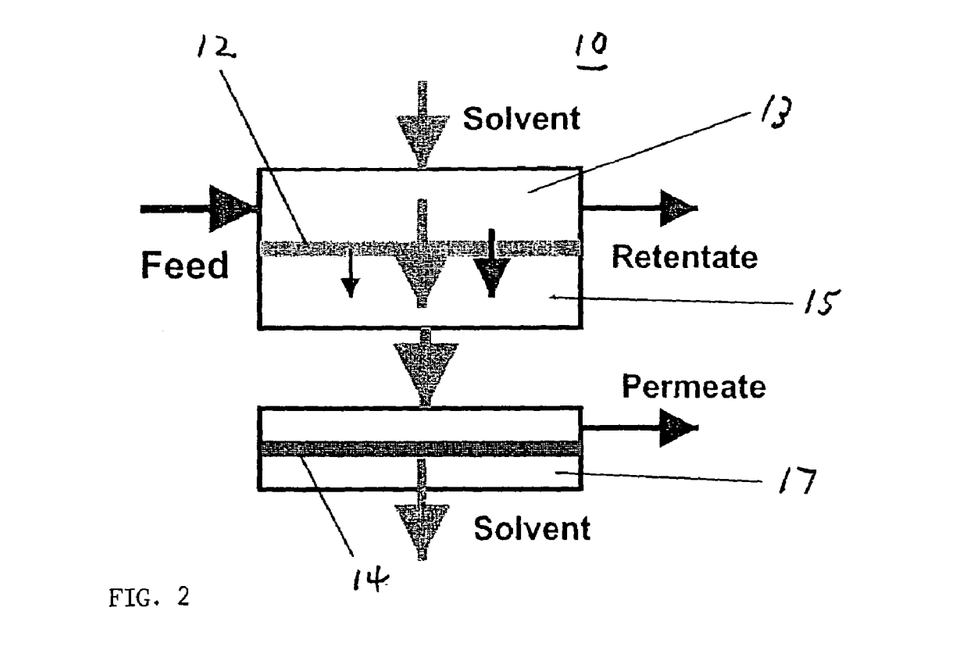
FIG. 2 illustrates the fundamental operation of stage 10 according to the invention that includes a diafilter 12 and ultrafilter 14 combination.

The design strategy used by the inventor in arriving at the present invention consisted of: (i) recognizing the dual solvent role, as both a convective transporter and as a separating agent; (ii) splitting the problem and the solution into two parts—specifically into fractionation of solutes and solvent management. More specifically, the inventor has discovered a novel membrane-based separation cascade system wherein the solvent is used as both a convective transporter and as a separating agent. This cascade-based system can be used for separating two solutes as a solute/solute pair (solute 1 and 2; retentate and permeate; waste and permeate) from a feed stream. FIG. 1(A) depicts a conventional membrane separation of a feed stream into retentate and permeate streams using a single membrane 11 with the optional routing of solvent back to a feed stream. In contrast, FIG. 1(B) illustrates a membrane-based separation according to the present invention utilizing multiple membranes to generate retentate and permeate streams. The solutes are initially contained in the feed stream, and the solvent can be added either to the entering feed stream or, as shown in FIG. 1(B), spatially distributed over a retentate-containing compartment. FIG. 2 illustrates the fundamental operation of stage 10 according to the invention that includes a diafilter 12 and ultrafilter 14 combination.

In a first filtration step shown in FIG. 2, a diafiltration membrane 12 is capable of separating the feed stream into permeate and retentate (waste). The retentate remains in the feed stream-containing compartment 13 and can be recovered. The permeate and the solvent pass into the permeate-containing compartment 15 and are subject to second filtration step.

Figure 3:
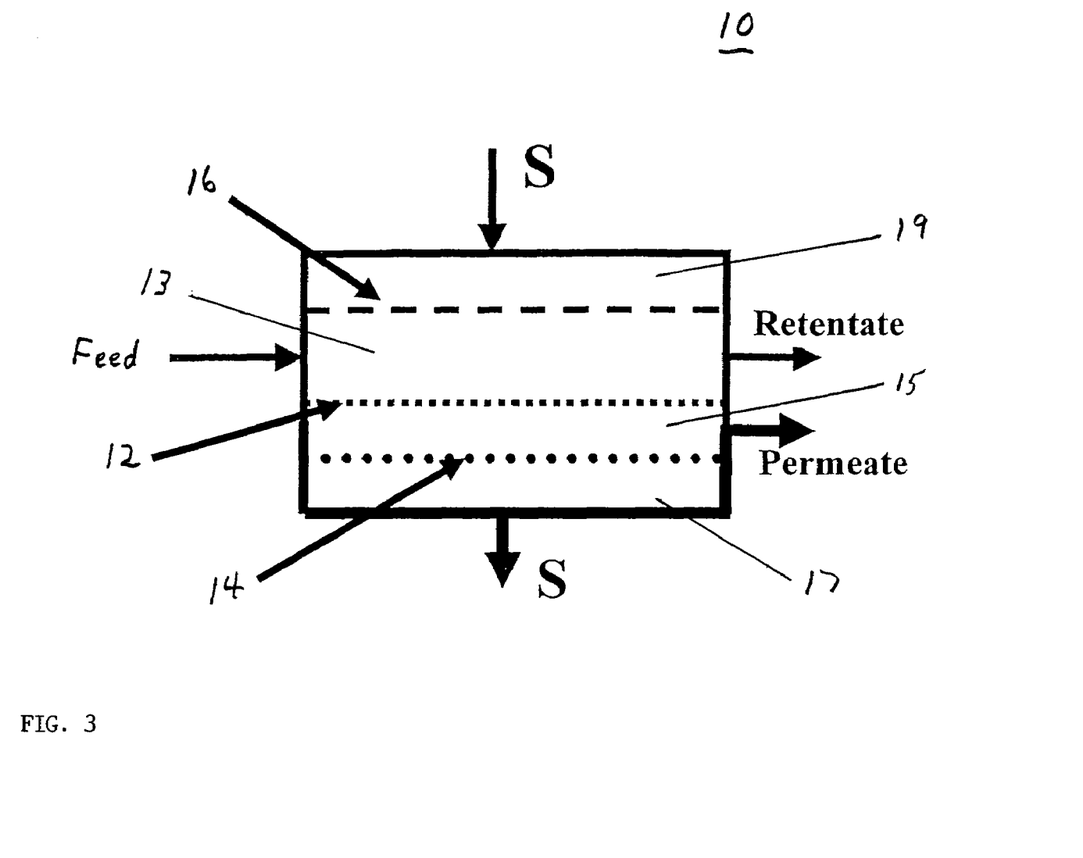
FIG. 3 shows an embodiment of a stage 10 according the invention which includes diafilter 12, ultrafilter 14 and optional macroporous membrane 16 in a single housing.
Figure 4:
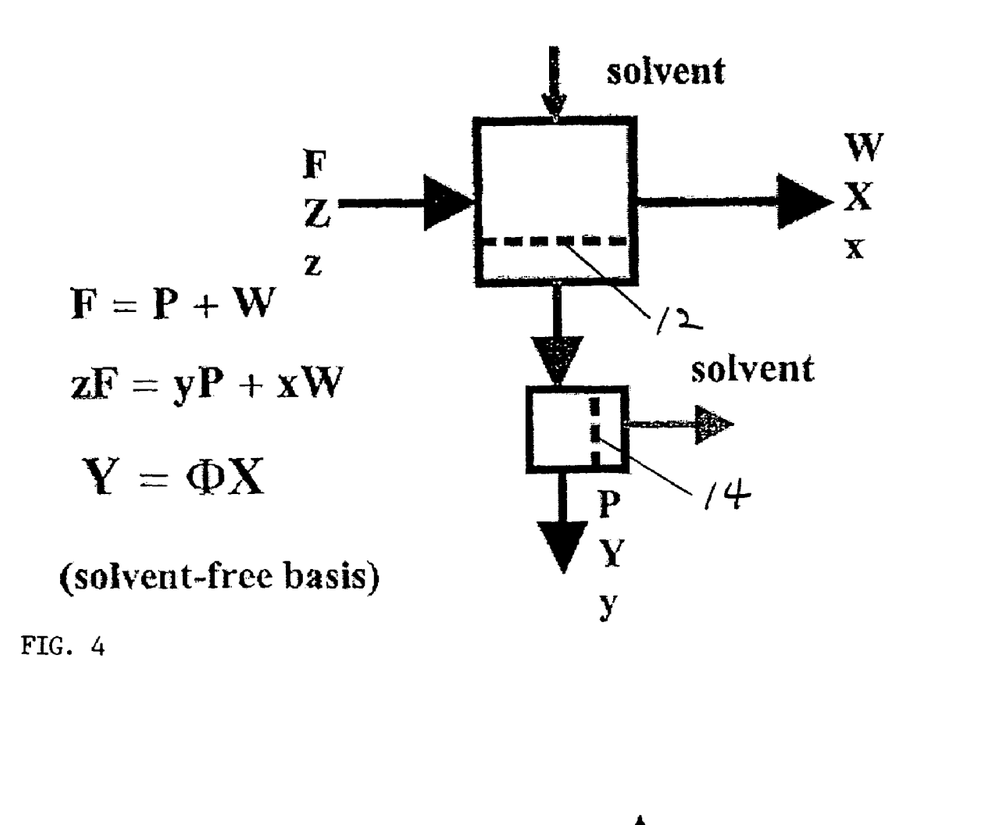
FIG. 4 depicts a diafilter 12/ultrafilter 14 combination according to the invention and related mathematical relationship of feed (F), moles of product (P) and waste (W) based on a solvent-free system.

Still referring to FIG. 2, an ultrafiltration membrane 14 is positioned between the permeate-containing compartment 15 and a second solvent-containing compartment 17. The purpose of ultrafiltration membrane 14 is to remove excess solvent from the permeate, and it should be essentially impermeable to either of the solutes to be separated from one another. As a result of this filtration step, the permeate becomes separated from the solvent. Ultrafilter 14 may be contained with diafilter 12 in the same housing, as shown in FIG. 3, or, alternatively, ultrafilter 14 may provided in a separate housing from diafilter 12, as FIG. 4 depicts.

Figure 5:
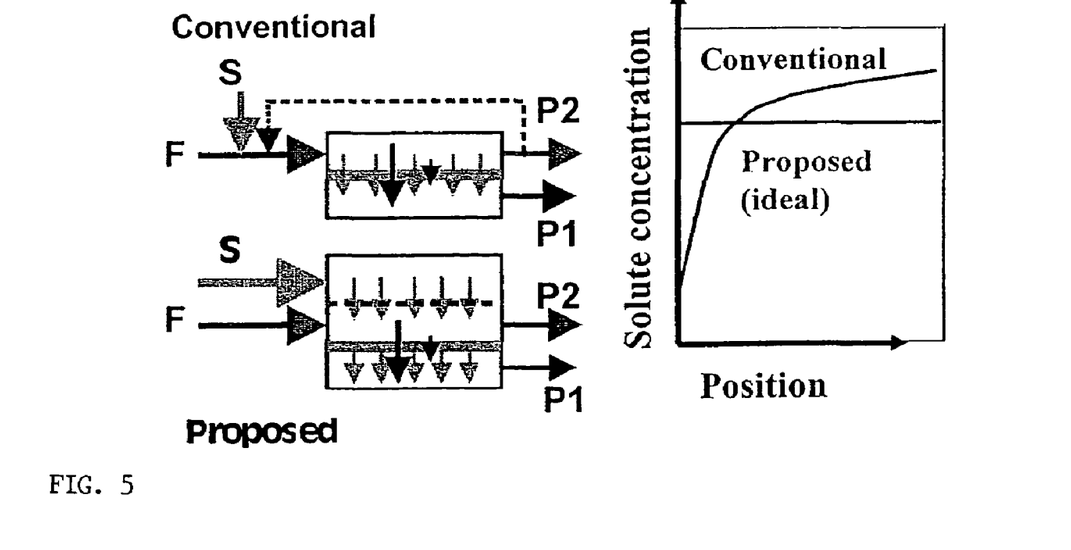
FIG. 5 illustrates solute concentration dynamics for conventional separation versus separation based on the invention.

Configurations according to the invention lessen the amount of solvent consumed for a given amount of solute transported across the membrane and decreases the ranges of upstream solute concentrations. This is because all solvent consumed by diafiltration must be supplied at the inlet, using the conventional design, rather than introduced locally for solute transport, as in the proposed new design. Since the ratio of water to solute transport increases with dilution, there is an excess of solvent initially, and perhaps too little toward the exit of conventional equipment. FIG. 5 illustrates solvent flow differences between conventional and the presently-disclosed system. In addition, FIG. 5 compares solute concentration along a membrane for conventional and the present system.

Solvents are typically highly purified sterile water blended with pH buffers and represent a major cost of diafiltration. Decreasing solvent use thus directly reduces the cost of the diafiltration process. In addition removal of excess solvent either increases required membrane area, raising capital costs directly, or requires higher trans-membrane pressures, raising operating costs. Finally, excess solvent must be removed from the filtrate, typically by ultrafiltration, and this represents an additional cost. In general some upstream compositions are more desirable than others, and it is desirable to depart as little as possible from these optimum levels.

Uniform conditions within a diafiltration stage can also be approached by rapid recirculation through a conventional apparatus, as shown by the dotted line in FIG. 1A, but this requires repeated pumping and can damage sensitive materials such as proteins.

Figure 6:
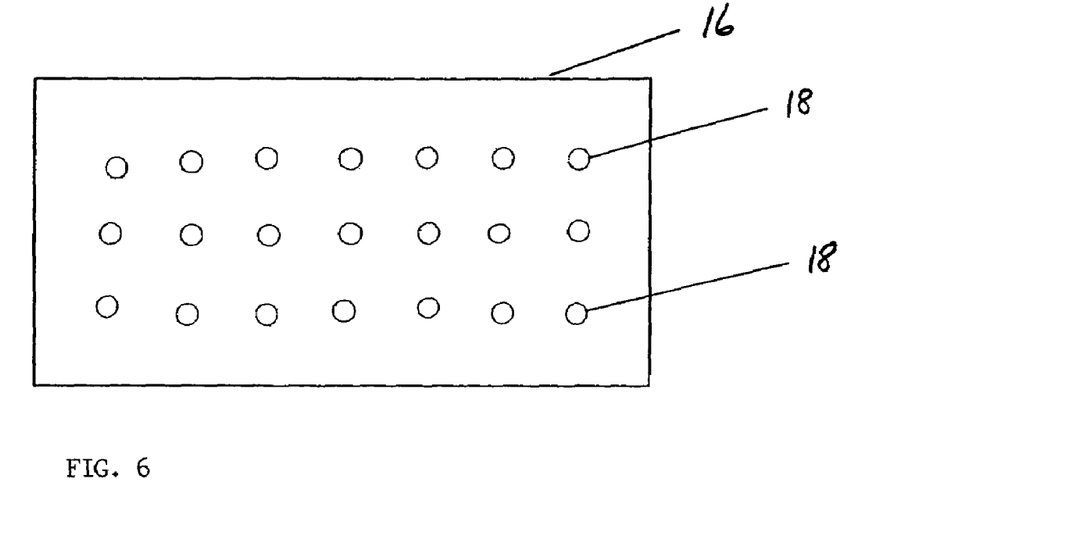
FIG. 6 shows a macroporous membrane 16 with equally spaced apertures 18 useful in certain embodiments of the invention.

In certain embodiments, a macroporous membrane 16 is included upstream of the described diafiltration membrane 12, as shown in FIG. 3. Macroporous membrane 16 is positioned between a first solvent-containing compartment 19 and the feed stream-containing compartment 13. Macroporous membrane 16 is capable of selectively-passing the solvent from the solvent-containing compartment 19 to the feed stream-containing compartment 13. The purpose of macroporous membrane 16 is to control the spatial distribution of solvent into the feed stream-containing compartment 13. The macroporous membrane 16 should not permit entrance of feed solution from the permeate compartment. This latter constraint can be met by ensuring that pressure at all points in the upper compartment is always greater than in the adjacent feed stream. It can for example be assured by using a positive displacement solvent pump and designing the system so that pressure drop across the upper surface is greater than the pressure drop in the feed stream. An exemplary macroporous membrane 16 with a plurality of apertures 18 is shown in FIG. 6. Macroporous membranes may be fabricated from a sintered granular plate, a tight screen, or other materials. One of ordinary skill in the art will know to vary the number as well as the size of perforations without departing from the spirit of the invention. Important for practicing the invention is that the distances in the lateral and flow directions between perforations should be small compared to the corresponding dimensions of the stage.

Figure 9A:
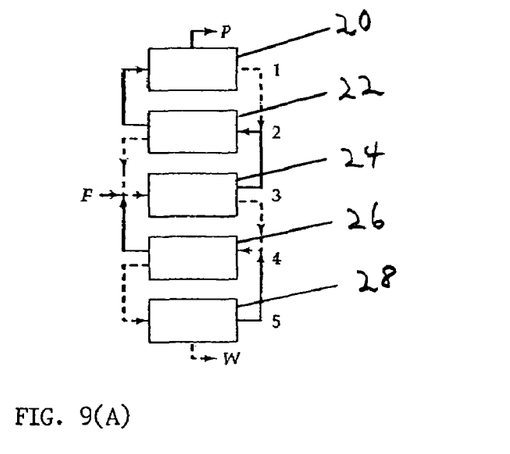
FIG. 9(A) depicts the general linear counterflow of a cascade separation according to the present invention. Stages 20, 22, 24, 26 and 28, shown in box form, each comprise diafilter and ultrafilter.

An ideal counterflow cascade is illustrated in the flow diagram depicted in FIG. 9A in which the DF/UF units 20, 22, 24, 26 and 28 are shown as blocks. The flow diagram depicted is based on solvent free streams. In a fashion analogous to other linear counterflow cascades the permeate from each stage enters the retentate compartment of the next above stage while the retentate flow enters the retentate compartment of that immediately below. Thus, two streams enter each stage except those at the two ends of the cascade and three to the feed stage. The cascade is termed "ideal" if the solvent free compositions of the two entering streams are identical. This situation and its physical significance on separation are illustrated by the graph in FIG. 9(B).

Figure 9B:
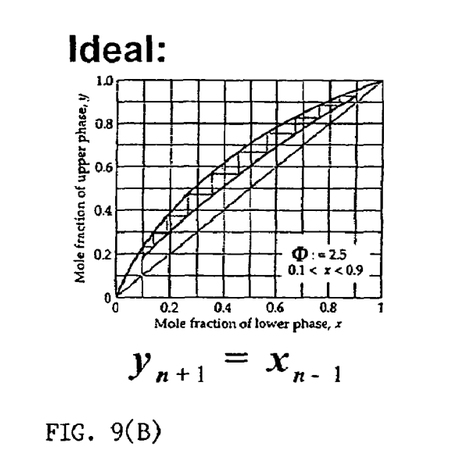
FIG. 9(B) shows a graphical representation of the ideal solute separation achieved by the counterflow cascade of FIG. 9(A).

Accordingly, the present invention is directed to counter flow cascade separation systems for separating a solute/solute pair in a solvent. A counter flow cascade separation system according to the invention comprises a series of interconnected stages in which each stage includes a diafilter that accepts a flow stream containing a solute/solute pair in a solvent. The diafilter is preferentially permeable for a first solute of the solute/solute pair and the diafilter preferentially passes the first solute to a permeate flow while preferentially retaining the remaining solute in a retentate flow. The stage further includes an ultrafilter that accepts from the diafilter the permeate flow wherein the ultrafilter is selectively permeable to the solvent but not the remaining solute contained in the permeate flow. Stages of the system are interconnected so that each stage beyond an first stage accepts an intermixed flow stream formed by combining retentate flow and permeate flow from different stages wherein intermixed retentate flow and permeate flow each have the solute/solute pair present in substantially the same molar ratio. The solute/solute pair is thusly separated by counter flow cascade through the interconnected series of stages. FIG. 9(A) provides a flow diagram illustrating the above-described system and, in addition, FIG. 9(B) illustrates the results of the present system on stage-to-stage solute concentration.

In preferred embodiments, the system consists of three interconnected stages. Preferred systems according to the invention recycle solvent collected by ultrafilters and route that solvent back to a flow stream. In certain embodiments, a system according to the invention includes at least one stage that further comprises a macroporous membrane capable of distributing solvent evenly over the diafilter.

In another embodiment, the invention provides a method for separating a solute/solute pair in a solvent. Such a method includes steps of routing a flow stream containing a solute/solute pair in a solvent to a diafilter that is preferentially permeable for a first solute of the solute/solute pair. The diafilter preferentially passes the first solute to a permeate flow while preferentially retaining the remaining solute in a retentate flow. The permeate flow is then routed to an ultrafilter that is selectively permeable to the solvent but not the remaining solute contained in the permeate flow in order that excess solvent contained in solvent is removed from the permeate flow.

The permeate flow and retentate flow are routed to successive interconnected stages wherein the stages beyond a first stage accept an intermixed flow stream formed by combining retentate flow and permeate flow from different stages. The intermixed retentate flow and permeate flow each have the solute/solute pair present in substantially the same molar ratio and operation of the system approaches an ideal cascade.

The invention is further directed to a stage in a counter flow cascade separation system for use in separating a solute/solute pair in a solvent. Such a stage includes a diafilter that accepts a flow stream containing a solute/solute pair in a solvent. The diafilter is preferentially permeable for a first solute of the solute/solute pair wherein the diafilter preferentially passes the first solute to a permeate flow while preferentially retaining the remaining solute in a retentate flow. The stage further includes an ultrafilter that accepts from the diafilter the permeate flow wherein the ultrafilter is selectively permeable to the solvent but not the remaining solute contained in the permeate flow. The stage is capable of separating the solute/solute pair into the permeate flow and retentate flow and the ultrafilter removes excess solvent from the permeate flow.

In a following example, the inventor first explains how binary stages (also termed "splitters") can be modified to deal with protein mixtures in a solvent. The inventors then show how binary stages can be connected to form ideal cascades, most likely the most economical configuration for practicing the present invention. The inventor shows by numerical example how a cascade separation according to the present invention is performed.

EXAMPLE 1

Mathematical Description of Ideal Cascade System

Figure 8:
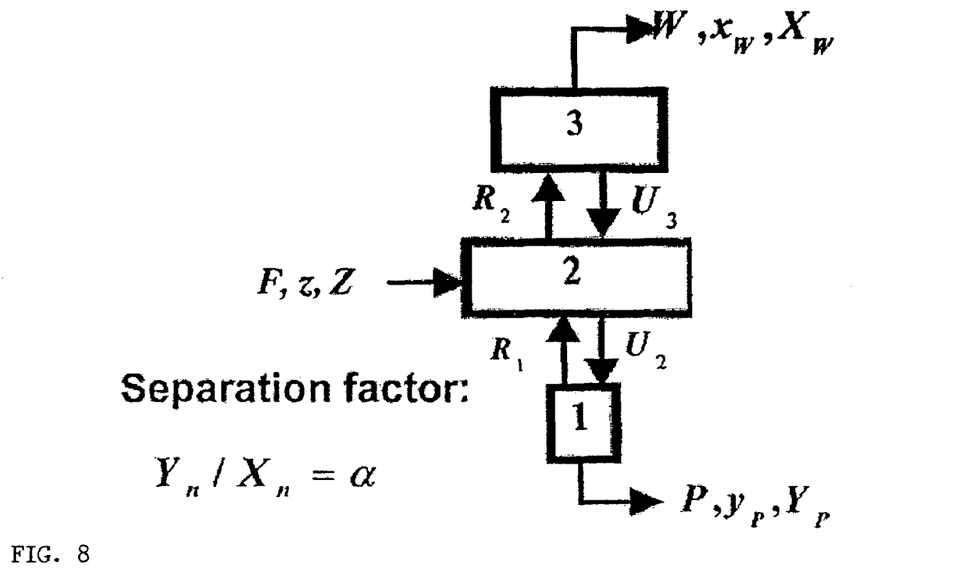
FIG. 8 illustrates a three stage ideal cascade in which feedsteam F is separated by the three stages (1, 2 and 3) into a waste stream (W) and a permeate stream (P).

Consider the simplest complete cascade shown in FIG. 8, consisting of three stages. For convenience, one may begin by working on a solvent-free basis and assume perfect mixing in the upstream compartment of each membrane module or stage. For this example, the state separation factor $\Phi$ is considered constant throughout the cascade. One may avoid blending streams of differing solute composition in accordance with ideal cascade theory and therefore require that $$X_1 = Y_3 = Z \tag{1}$$

Figure 7:
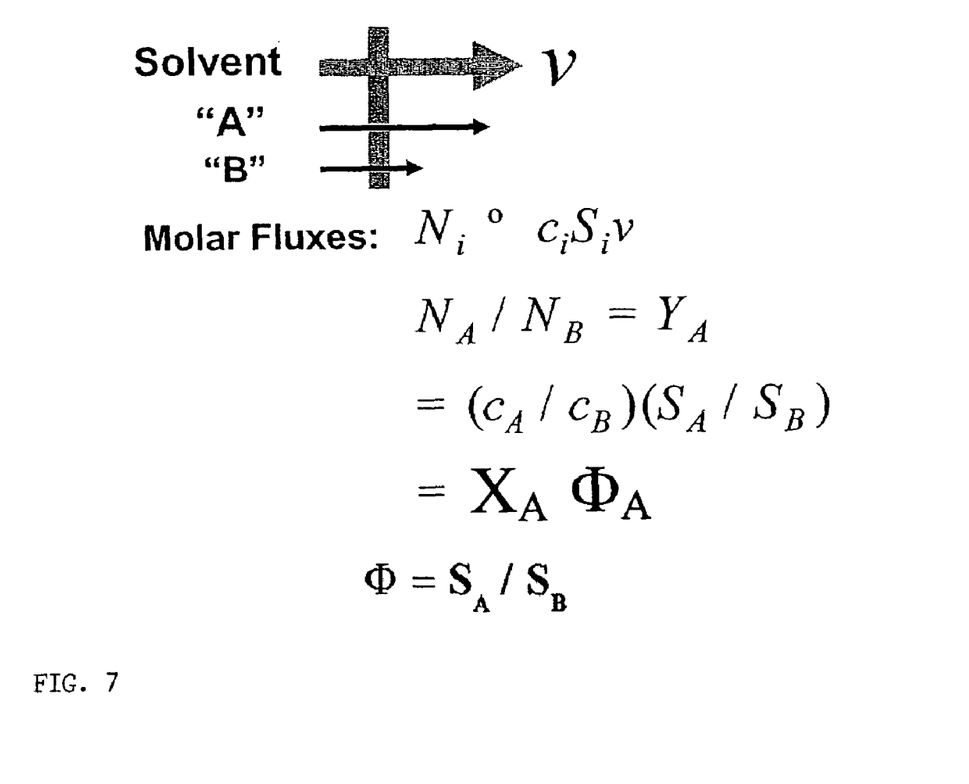
FIG. 7 depicts the mathematical definition of separability in a separation system according to the invention.

Here X is the mole ratio of solutes $\alpha$ and $\beta$ (i.e. moles $\alpha$/moles $\beta$) in the retentate; Y is the mole ratio of solutes $\alpha$ and $\beta$ in the permeate, and Z is the mole ratio of solutes $\alpha$ and $\beta$ in the feed. Also, x is the mole fraction $\alpha/(\alpha+\beta)$ in the retentate; y is the mole fraction $\alpha/(\alpha+\beta)$ in the permeate, and z is the mole fraction $\alpha/(\alpha+\beta)$ in the feed. The numerical subscripts refer to the stage within the cascade; the other symbols in the subscripts refer the definitions of the symbols in standard type. Using the definition of stage separation factor depicted in FIG. 7 ($\Phi$, where $\Phi = s_\alpha/s_\beta$ and s is the sieving factor of the indicated solute), one can complete the specification of terminal stream compositions:

$$Y_P = Y_1 = \Phi Z; \quad X_W = X_3 = Z/\Phi \tag{2,3}$$

and more generally $$Y_n = \Phi X_n = \sqrt{\Phi} Y_{n+1} \tag{4,5}$$

One may now go on to complete the mass balances for the system as a whole:

$$F = P + W; \quad zF = y_P P + x_w W \tag{6,7}$$

or $$z = \theta y_P + (1-\theta) x_w \tag{8,9}$$

where W=waste stream (retentate); F=total moles/time of feed; and P=moles of product, and $$\theta = \text{cut} = P/F$$

and $$1 - \theta = W/F$$

FIG. 4 illustrates W, F and P as they apply to a stage configuration. It now only remains to calculate the two remaining intermediate compositions by making similar balances about the top and bottom stages. These procedures are illustrated by the following specific example.

EXAMPLE 2

Fractionation of Lactalbumins

Figure 10:
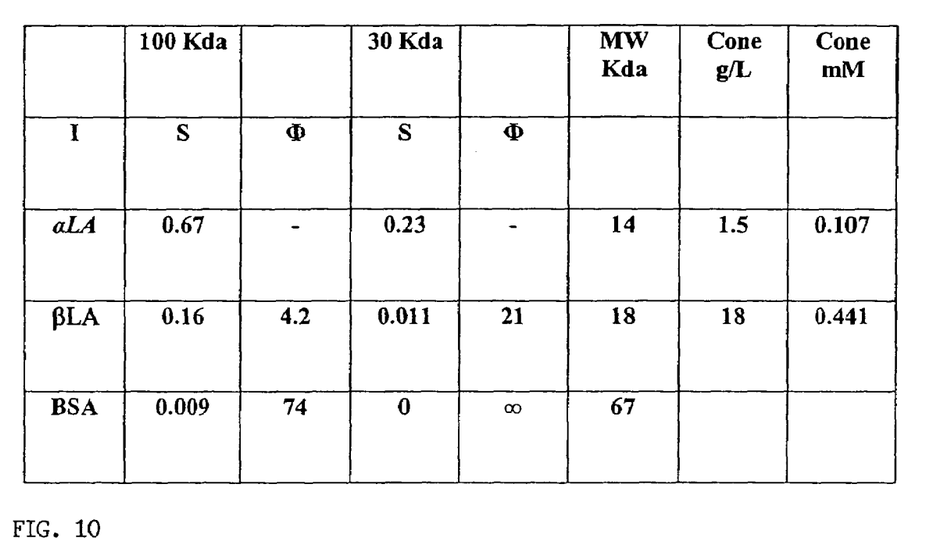
FIG. 10 depicts in tabular form values related to the fractionation of lactalbumin, as derived in the example section.

Assume by way of example the system described in the tabular form in FIG. 10 and use $\alpha$-lactalbumin ($\alpha$LA) as the product in a mixture with $\beta$-lactalbumin ($\beta$LA):

$$\Phi = 21 \text{ and } Z = 0.1071/0.441 = 0.2429 \tag{10}$$

These correspond to the system of Cheang and Zydney for their 30 kDa membrane example (Cheang, B., and A. L. Zydney, 2004, A two-stage ultrafiltration process for fractionation of whey protein isolate, *J. Mem. Sci.* 231, 159–167).

System Mass Balances

One may begin by defining the input to the system using a solvent-free feed rate of one millimole per minute. Then, in these units $$F = 1; \quad Z = 0.1071/0.441 = 0.2429; \quad z = 0.2429/1.2429 = 0.1954 \tag{11,12,13}$$

One may next note that for an ideal cascade $$Y_3 = X_1 = Z = 0.2429; \quad y_3 = x_1 = z = 0.1954 \tag{14,15,16}$$

and $$X_w = X_3 = Y_3/21 = 0.01157; \; x_3 = x_w = 0.01144 \quad (17,18)$$

while $$Y_p = Y_1 = 21X_1 = 5.1009; \; y_p = 0.8361 \quad (19,20).$$

One is now ready to calculate the α-lactalbumin yield, and this requires making two mass balances on the cascade. One should follow convention in writing one for total moles and the other for α-lactalbumin, all on a solvent-free basis:

$$F = P+W; \; zF = y_pP = x_wW \quad (21,22).$$

These equations can be combined to give $$z = y_p\theta + x_w(1-\theta); \; \theta = P/F \quad (23)$$

$$\theta = (z-x_w)/(y_p-x_w) = (0.1954-0.0144)/(0.8361-0.0144) = 0.2239 = P = 1-W \quad (24).$$

This quantity is known as the fractional cut for the separation. The yield of β-lactalbumin is then $$Y_\beta = \theta y_p/z = (0.2239 \cdot 0.8361)/0.1954 = 0.958 \quad (25a).$$

The yield of α-lactalbumin, obtained with a purity of 0.988 is $$Y_\alpha = (1-\theta)x_3/z = (1-0.2239) \cdot 0.989/0.8046 = 0.954 \quad (25b)$$

Stage Mass Balances

One may now calculate the intermediate stream rates and compositions that will be needed later in calculating solvent flows. One may begin by writing from Eq. 5 that $$X_2 = \sqrt{21} \cdot X_w = 4.58 \cdot 0.01157 = 0.05302; \; x_2 = 0.05035 \quad (26)$$

while $$Y_2 = Y_p/\sqrt{21} = 5.1009/4.5825 = 1.1131; \; y_2 = 0.05268 \quad (27).$$

Compositions are now complete, and it remains to calculate the (solvent-free) stream rates. One may begin with stage 1 and write $$U_2 = R_1+P; \; y_2U_2 = x_1R_1 + y_pP \quad (28,29)$$

where R=total moles/time of retentate and U=total moles/time of permeate (also referred to as ultrafiltrate).

It follows that $$0.5628 \; U_2 = 0.1954(U_2 - 0.2239) + 0.8361 \cdot 0.2239 \quad (30)$$

or $$(0.5268-0.1954)U_2 = 0.1872 - 0.1954 \cdot 0.2239 \quad (31)$$

$$U_2 = (0.1872-0.04375)/(0.5268-0.1954) = 0.4327 \quad (32).$$

Then, $$R_1 = 0.4327 - 0.2239 = 0.2088 \quad (33).$$

One may now turn to stage 3 and write $$R_2 = U_3+W = U_3+0.7761; \quad (34)$$

$$0.05035R_2 = 0.1954U_3 + 0.01144 \cdot 0.7761 \quad (35)$$

$$= 0.1945(R_2 - 0.7761) + 0.00888 \quad (36).$$

Then, $$R_2 = (0.1954 \cdot 0.7761 - 0.0089)/(0.1954 - 0.05035) = 0.984 \quad (37)$$

$$U_3 = 0.984 - 0.7761 = 0.2080 \quad (38).$$

Figure 11:
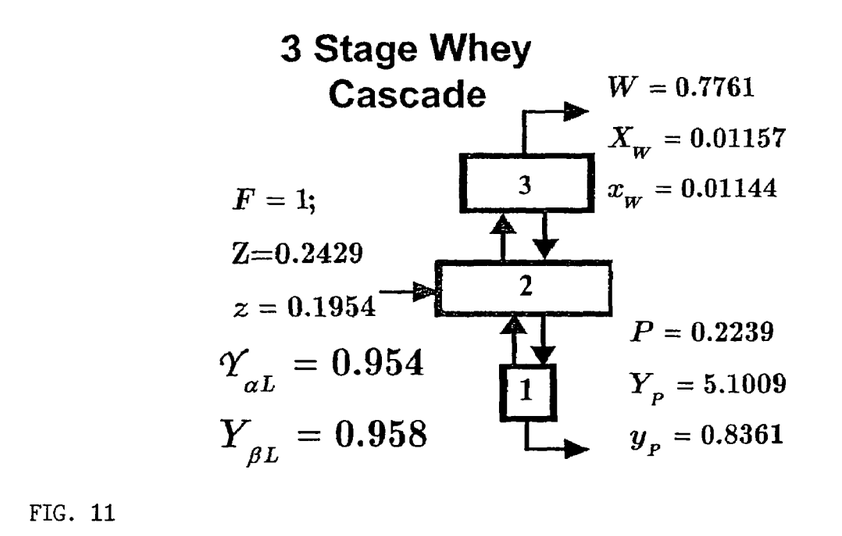
FIG. 11 illustrates a three stage cascade and factors for the separation of lactalbumins from whey, based on the values listed in FIG. 10.

The above-described system is graphically-applied to the corresponding cascade in FIG. 11. This completes specification of all streams on a solvent-free basis.

EXAMPLE 3

Solvent Flows

One may now reaches a point of great flexibility; there is no a priori requirement for using any particular solute concentration or even to use the same concentrations in all stages. Only the ratio of the two proteins is important. Moreover, since the only returns to the feed stage from the product, stage 1, and waste (retentate), stage 2, stages have the same solvent-free composition as the feed, one can even operate completely in a batch mode (see, e.g., FIG. 13(B)).

This flexibility relaxes constraints on solute concentrations, and one possible strategy presents itself immediately—and that is to always operate at the maximum concentration permitted by the nature of the system. This, in turn, can be different for each stage, but there is of course an advantage to simplicity so one assumes identical concentrations for all streams in a numerical example.

The use of diafiltration is inherent in the method described herein and is an important purification step in that it removes low molecular weight impurities. Thus, one may be able to use higher than feed concentration in all stages, including the feed stage. This latter fact is because the composition within a well-mixed stage is that of the exit from the stage, $x_2$, not the feed composition z. Diafiltration through this stage will have removed a large fraction of low molecular weight impurities originating in the feed.

Solvent Flows for Uniform Solute Concentration

Assuming that the basis is one millimole of protein feed per minute, one may now calculate stream rates through the presently-described system. Beginning with the combined streams to the feed stage 2 of FIG. 11, one may write that the molar rate M of protein transport into stage 2 is $$M_F = F+U_3+R_1 = 1+0.2080+0.2088 = 1.4168 \text{ m-moles/min} \quad (39)$$

and the total molar concentration is $$c_{tot} = 0.548 \text{ m-mols/L} \quad (40).$$

Then the volumetric flow rate, Q, of solution to stage 2 is $$Q_F = 1.4168/0.548 = 2.585 \text{ L/min} \quad (41).$$

The corresponding flows of retentate and ultrafiltrate are $$Q_R = 0.984/0.548 = 1.796 \text{ L/min} \quad (42)$$

$$Q_U = 0.437/0.548 = 0.797 \text{ L/min} \quad (43).$$

One may next write for the rate of protein transport across the stage 2 membrane $$M = Avc \; [X_{\alpha L}S_{\alpha L} + (1-X_{\alpha L})S_{\beta L})] = 0.4327 \text{ m-moles/min} \quad (44)$$

where A=membrane area, v=transmembrane velocity, and c=concentration or $$Q_D = Av = 0.4327/(0.548 \cdot 0.1264) = 6.247 \text{ m-moles/min} \quad (45).$$

It follows that the amount of solvent that must be removed by the secondary membrane is $$Q_S = Q_D - Q_U = 6.247 - 0.797 = 5.5 \text{ L/min} \quad (46).$$

Flows across the other two stages can be calculated similarly. Note, however, that these are only representative numbers to illustrate the procedures that must be followed. Control of solvent flows must be determined by the designer to suit the system and process requirements.

EXAMPLE 3

Operation of a Model Diafilter with Continuous Solvent Feed

This example is directed to the operation of a model diafilter with continuous solvent feed This situation is equivalent mathematically to the classic diafiltration, but with continuous solvent replacement. A simple mass balance gives:

$$-V\, dc_i/dt = vAS_i c_i = QS_i c_i \quad (47)$$

$$-dc_i/d\tau = S_i c_i;\ \tau = V/Q \quad (48)$$

with $$c_i = c_{io}\ \text{at}\ t=0 \quad (49)$$

then $$c_i/c(0) = e^{-S_i \tau} \quad (50).$$

It follows that the molar mass of "i" remaining in the volume element (retentate) at any time is $$M/M(0) = e^{-S_i \tau} \quad (51)$$

and that in the accumulated permeate is $$M_f/M_i(0) - M_i = M_i(0)[1 - e^{-S_i \tau}] \quad (52).$$

The ratio of "i" in permeate to retentate is then $$M_f/M_i = [1 - e^{-S_i \tau}]/e^{-S_i \tau} = e^{S_i \tau} - 1 \quad (53).$$

Now the solvent-free mole ratios of species "A" in an "A"–"B" mixture for permeate and retentate are respectively $$X_A = M_A/M_B;\ Y_A = M_A/M_B \quad (54)$$

and the global separation factor is $$\Phi_{IAglobal} = Y_A/X_A = (e^{S_A \tau} - 1)/(e^{S_B \tau} - 1) \quad (55).$$

One may now consider limiting behavior:
1) $\tau,\ t \to 0$:

Here $e^{S\tau} \to 1 + S_\tau$ and $\Phi_A = S_A/S_B$ (56)

2) $\tau,\ t \gg 1$:

Here $\Phi_A = e^{S_A \tau}/e^{S_B \tau}$ (57)

Figure 12:
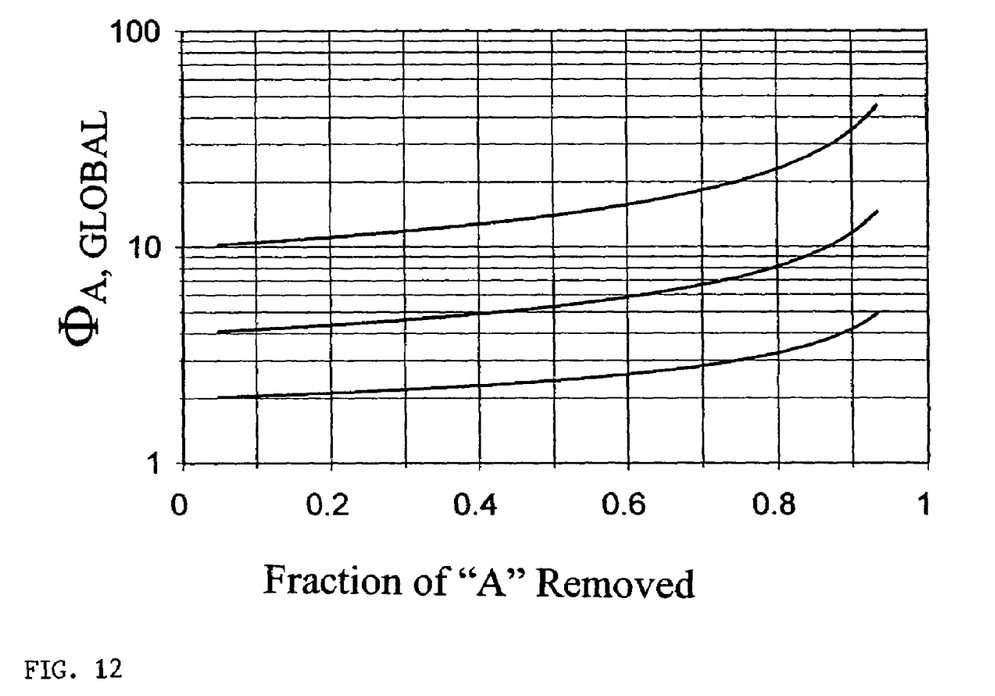
FIG. 12 illustrates the calculation of a global separation factor ($\Phi_{A, global}$) and same plotted against fraction of solute A removed.

This value can be large and representative examples of the global separation factor are shown in FIG. 12.

Separation factors vary strongly with fractional cut, and this variation must be considered in any design. This then means that for ideal cascades the proper criterion, only mixing streams of identical solvent-free composition, is difficult to select. Qualitatively similar behavior can be expected when solvent is not replaced.

Cross-Flow Sieving

Figure 14:
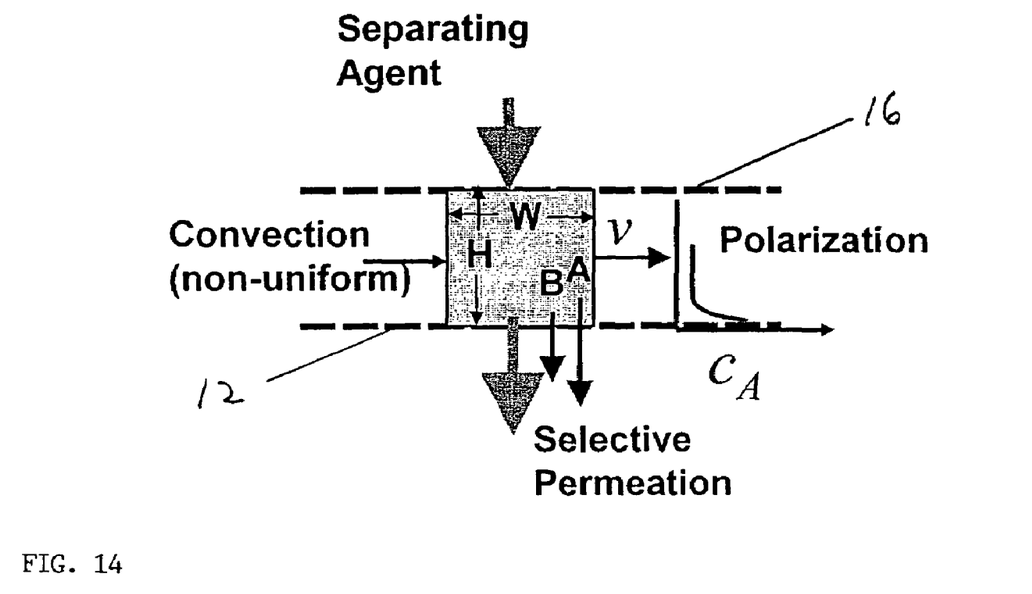
FIG. 14 illustrates cross-flow sieving in which a separating agent flows perpendicularly through a macroporous filter (16; upper dashed line) to a feed stream flow and solutes A and B contained in the feed stream flow permeate a diafilter (12; lower dashed line) in a selective manner.

Analysis of the cross-flow sieving (FIG. 14) shows two causes of variability of the sieving coefficient. One cause is polarization, which results in increase of concentration at the barrier. This is unfavorable on balance because it is strongest for the less permeable species of molecules. The other cause of variability is the cross-flow increase of effective stage separation factor. This is beneficial and militates against stirred retentate compartment.

EXAMPLE 4

Batch Operation

Figure 13A:
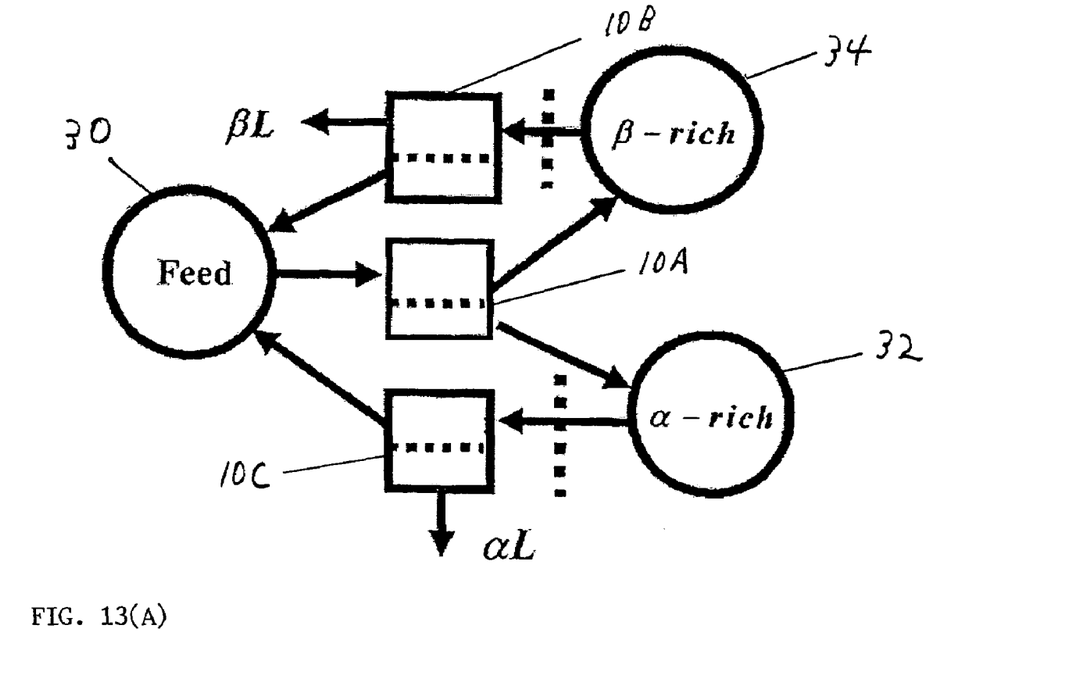
FIG. 13(A) depicts the batch operation of a cascade system for the separation of alpha and beta lactalbumins.
Figure 13B:
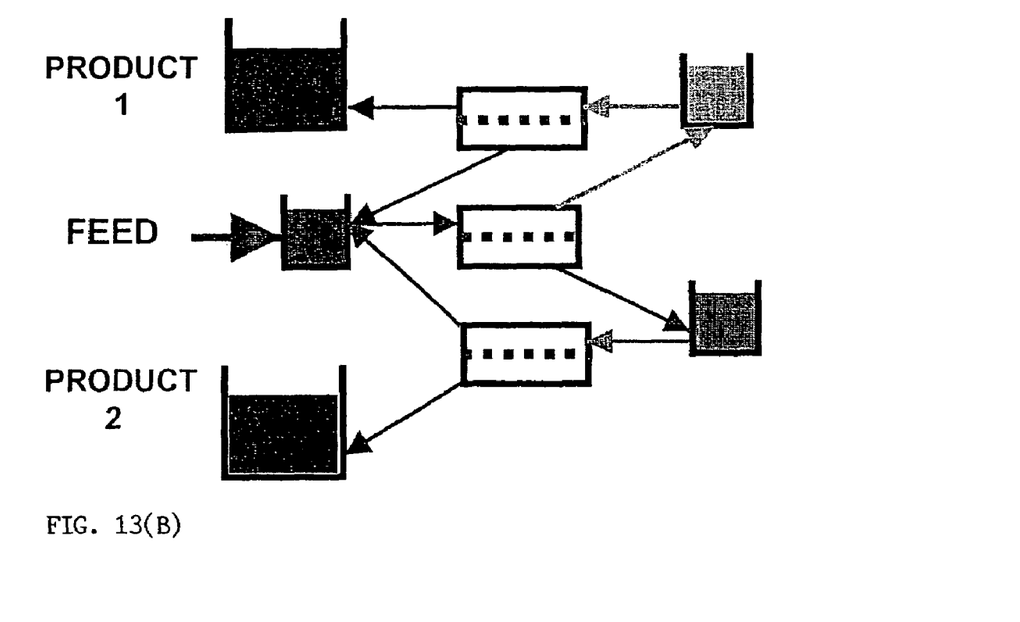
FIG. 13(B) shows batch operation of a cascade system according to the invention in generalized form.

One may operate this system as a batch process in which feed from a storage tank 30 (at left in FIG. 13(A)) is introduced to an appropriately sized diafiltration/ultrafiltration (DF/UF) stage 10A and the two output streams are fed to two additional tanks, one tank 32 for the alpha lactalbumin ($\alpha$-L) rich stream, the ultrafiltrate, and one tank 34 for the beta lactalbumin ($\beta$-L) rich stream, or retentate. One can then process these two intermediate streams and direct the filtrate of the $\beta$-L rich tank 34 back to the feed tank 30 and sends the retentate out as purified $\beta$-L. Correspondingly, one sends the retentate from the $\alpha$-L tank to the feed tank and the ultrafiltrate out as purified $\alpha$-L. In this way, the overall process is broken down into three simpler components each related to a standard diafiltration.

SUMMARY

In summary, the inventor demonstrates that binary ideal cascade theory can be extended to systems of two solutes in a single solvent. The basic unit or stage in the modified cascade comprises a first, diafiltration unit, combined with a second, ultrafiltration unit. The ultrafiltration unit operates on the permeate that is obtained from the diafilter. The diafiltration membrane is selective for one of the two solutes, and the ultrafiltration membrane passes only the solvent.

In the example section, the inventor demonstrates how the filtration rates through DF and UF membranes can be controlled so that individual stages can be combined and operated to conform to ideal cascade theory for fractionation of the two solutes from one another. An example is provided using experimental data in the reviewed literature for the simplest case of a three-stage cascade. For the first time, the inventor shows that a three-stage cascade can be operated in batch mode.

The system and method described here can be used for separation of different kinds of soluble molecules. Even though the examples described refer to such biomolecules as proteins, one of ordinary skill will know how to use the technology described herein for separation of both biological and non-biological materials, including but not limited to, petrochemicals, plasmids, viruses, organelles and whole cells.

Unless defined otherwise, all technical and scientific terms used herein have the same meanings as commonly understood by one of ordinary skill in the art to which this invention belongs. All references cited herein are hereby incorporated by reference in their entirety and for all purposes as if fully set forth herein. It is understood that the invention is not limited to the embodiments set forth herein for illustration, but embraces all such forms thereof as come within the scope of the description provided.

What is claimed is:

1. A counter flow cascade separation system for separating a solute/solute pair in a solvent, comprising a series of interconnected stages in which each stage comprises:
   a feed for accepting a flow stream containing a solute/solute pair in a solvent;
   a diafilter in communication with the feed wherein said diafilter has a diafilter membrane preferentially permeable for a first solute of the solute/solute pair in the solvent and less permeable to the second solute wherein said first solute is preferentially conveyed to a diafilter permeate flow and the remaining second solute is preferentially retained in a diafilter retentate flow; and an ultrafilter positioned to accept said diafilter permeate flow wherein said ultrafilter has an ultrafilter membrane exclusively permeable to the solvent contained in the diafilter permeate flow wherein solvent in the diafilter permeate flow passes through said ultrafilter membrane to a solvent flow;

wherein said series of interconnected stages includes a first feed stage receiving said flow stream from a source outside the system, the stream retained by the diafilter of the feed stage is directed to a second stage and the stream retained by the ultrafiltration membrane in the feed stage is directed to a third stage, wherein the stages are interconnected so that each stage beyond a first stage accepts an intermixed flow stream formed by combining retentate flow and permeate flow from different subsequent stages, wherein the intermixed retentate and permeate flow each has the solute/solute pair present in substantially the same molar ratio; the first solute and second solute exiting said system at different terminal stages.

2. The counter flow cascade separation system according to claim 1 comprising three stages.

3. The counter flow cascade separation system according to claim 1 wherein said solvent flow from at least one of said stages is recycled within the system.

4. The counter flow cascade separation system according to claim 1 wherein at least one stage further comprises a macroporous membrane positioned to accept the solvent flow and spatially distribute said solvent over the diafilter membrane.

5. The counter flow cascade separation system according to claim 1 wherein at least one stage includes said diafilter and ultrafilter within a single housing.

6. A method for separating a solute/solute pair in a solvent using a counter flow cascade separation system, said method comprising steps of:

routing a flow stream containing a solute/solute pair in a solvent to a feed;

routing said flow stream to a diafilter in communication with the feed wherein said diafilter has a diafilter membrane preferentially permeable for a first solute of the solute/solute pair in the solvent and less permeable to the second solute wherein said first solute is preferentially conveyed to a diafilter permeate flow and the remaining second solute is preferentially retained in a diafilter retentate flow; and routing said diafilter permeate flow to an ultrafilter positioned to accept said diafilter permeate flow wherein said ultrafilter has an ultrafilter membrane exclusively permeable to the solvent contained in the diafilter permeate flow wherein solvent in the diafilter permeate flow passes through said ultrafilter membrane to a solvent flow;

wherein said series of interconnected stages includes a first feed stage receiving said flow stream from a source outside the system, the stream retained by the diafilter of the feed stage is directed to a second stage and the stream retained by the ultrafiltration membrane in the feed stage is directed to a third stage, wherein the stages are interconnected so that each stage beyond a first stage accepts an intermixed flow stream formed by combining retentate flow and permeate flow from different subsequent stages, wherein the intermixed retentate and permeate flow each has the solute/solute pair present in substantially the same molar ratio; the first solute and second solute exiting said system at different terminal stages.

* * * * *